Figure 1:
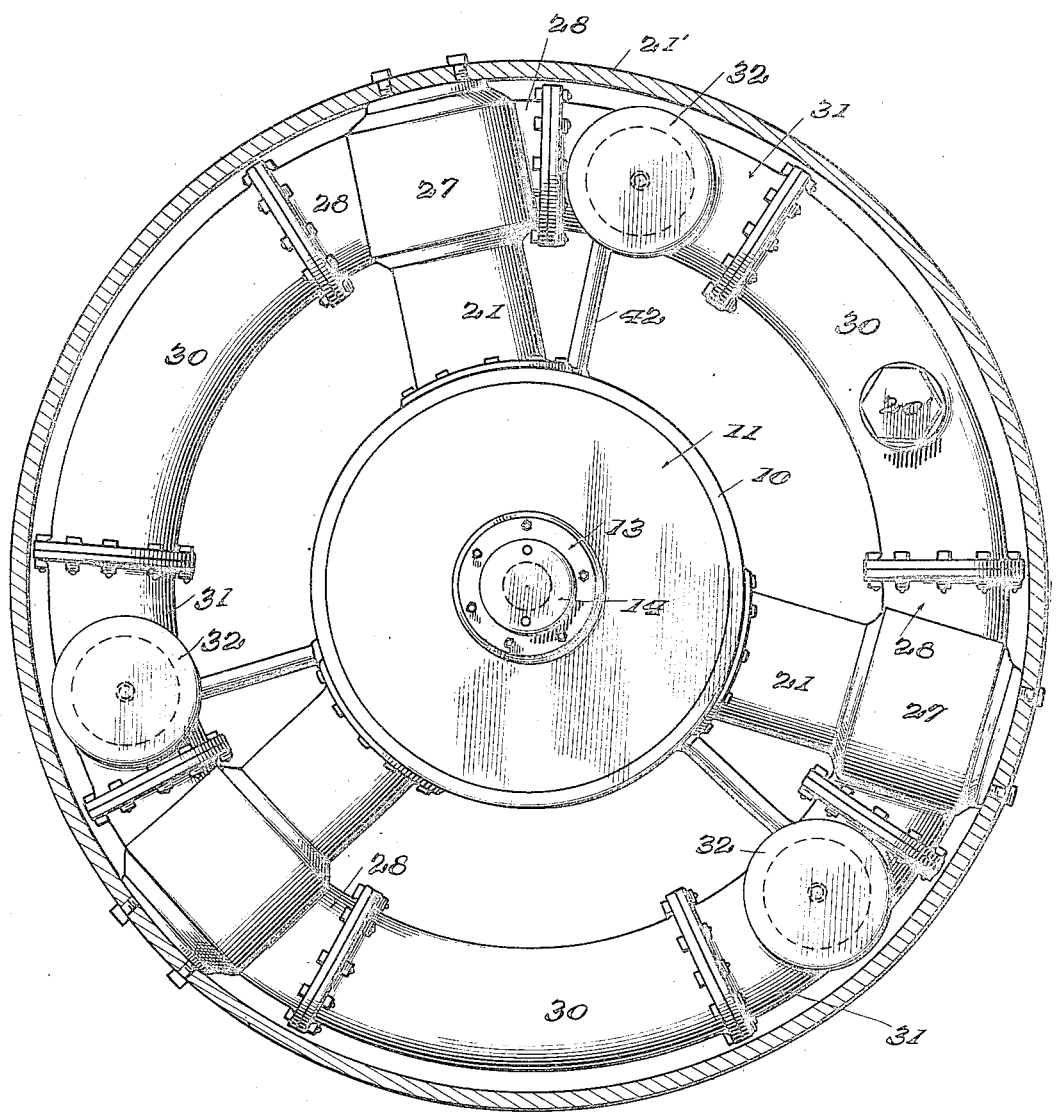

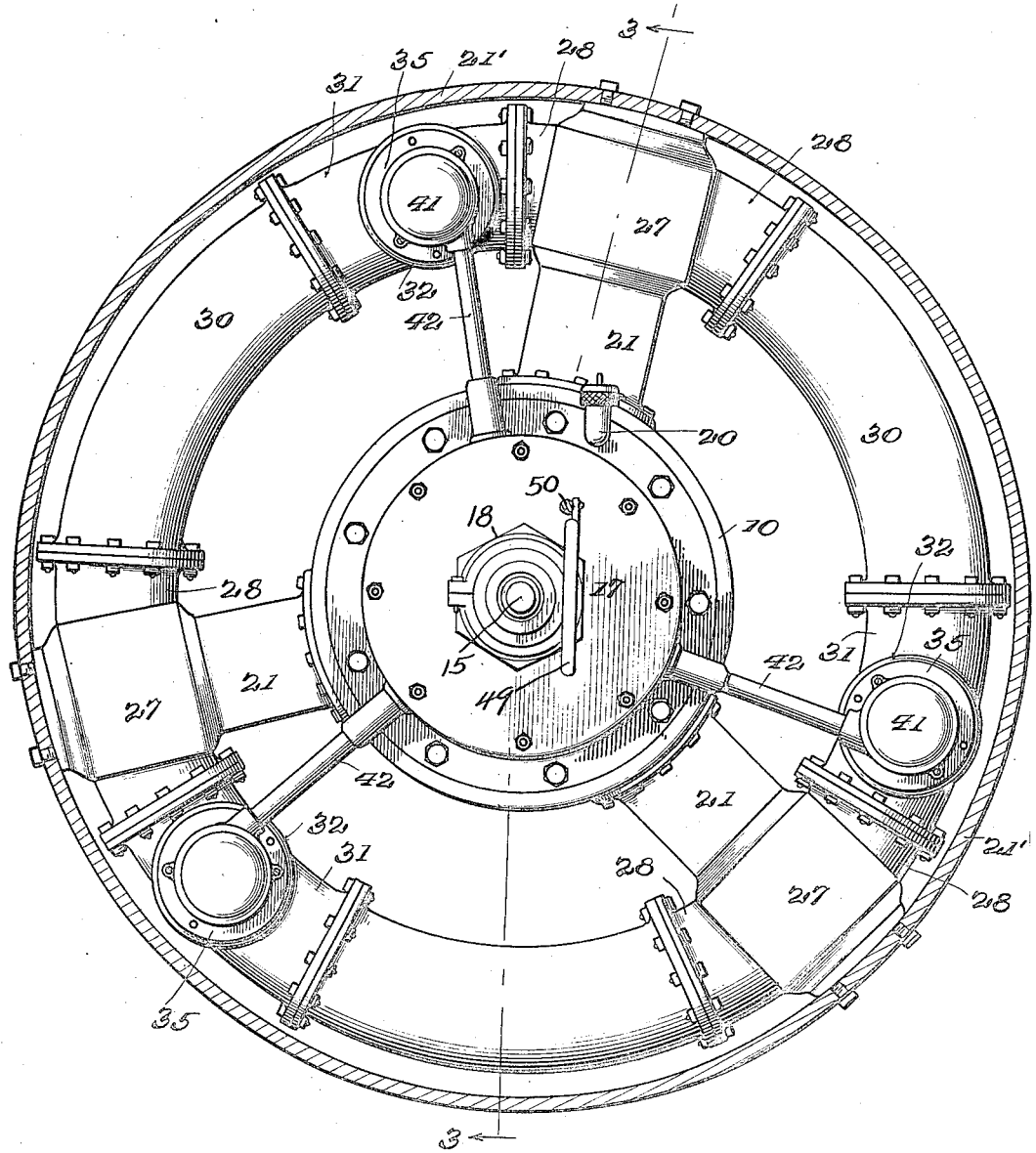

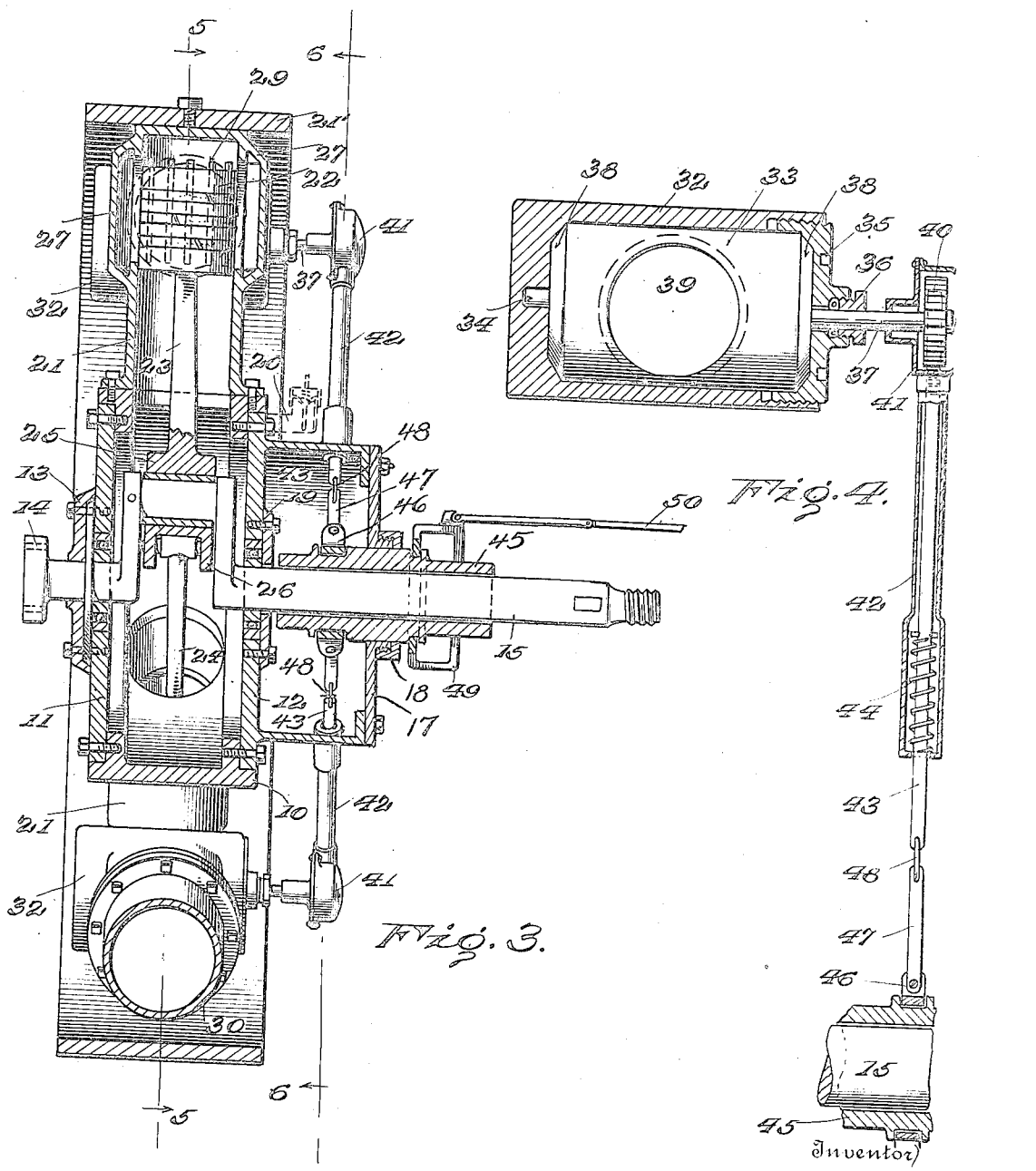

Feb. 13, 1923.

E. D. HILBISH.
FLUID TRANSMISSION.
FILED AUG. 14, 1920.

1,445,512.

Fig. 6.

Inventor
E. D. Hilbish.
By Lacy & Lacy, Attorneys

Patented Feb. 13, 1923.

1,445,512

UNITED STATES PATENT OFFICE.

ELMER D. HILBISH, OF TUSCALOOSA, ALABAMA.

FLUID TRANSMISSION.

Application filed August 14, 1920. Serial No. 403,626.

*To all whom it may concern:*

Be it known that I, ELMER D. HILBISH, citizen of the United States, residing at Tuscaloosa, in the county of Tuscaloosa and State of Alabama, have invented certain new and useful Improvements in Fluid Transmissions, of which the following is a specification.

This invention relates to an improved fluid transmission and has as one of its principal objects to provide a practical and efficient mechanism which will eliminate the necessity for the use of change speed gears or the usual engine clutch.

The invention has as a further object to provide a transmission which will operate smoothly and uniformly and wherein the functioning of the transmission may be readily controlled.

And the invention has as a still further object to provide a transmission which, under ordinary conditions, will offer a minimum resistance to turning movement but wherein means will be provided for gradually increasing said resistance until the drive and driven shafts of the transmission are caused to turn in unison.

Other and incidental objects will appear hereinafter.

Figure 5:
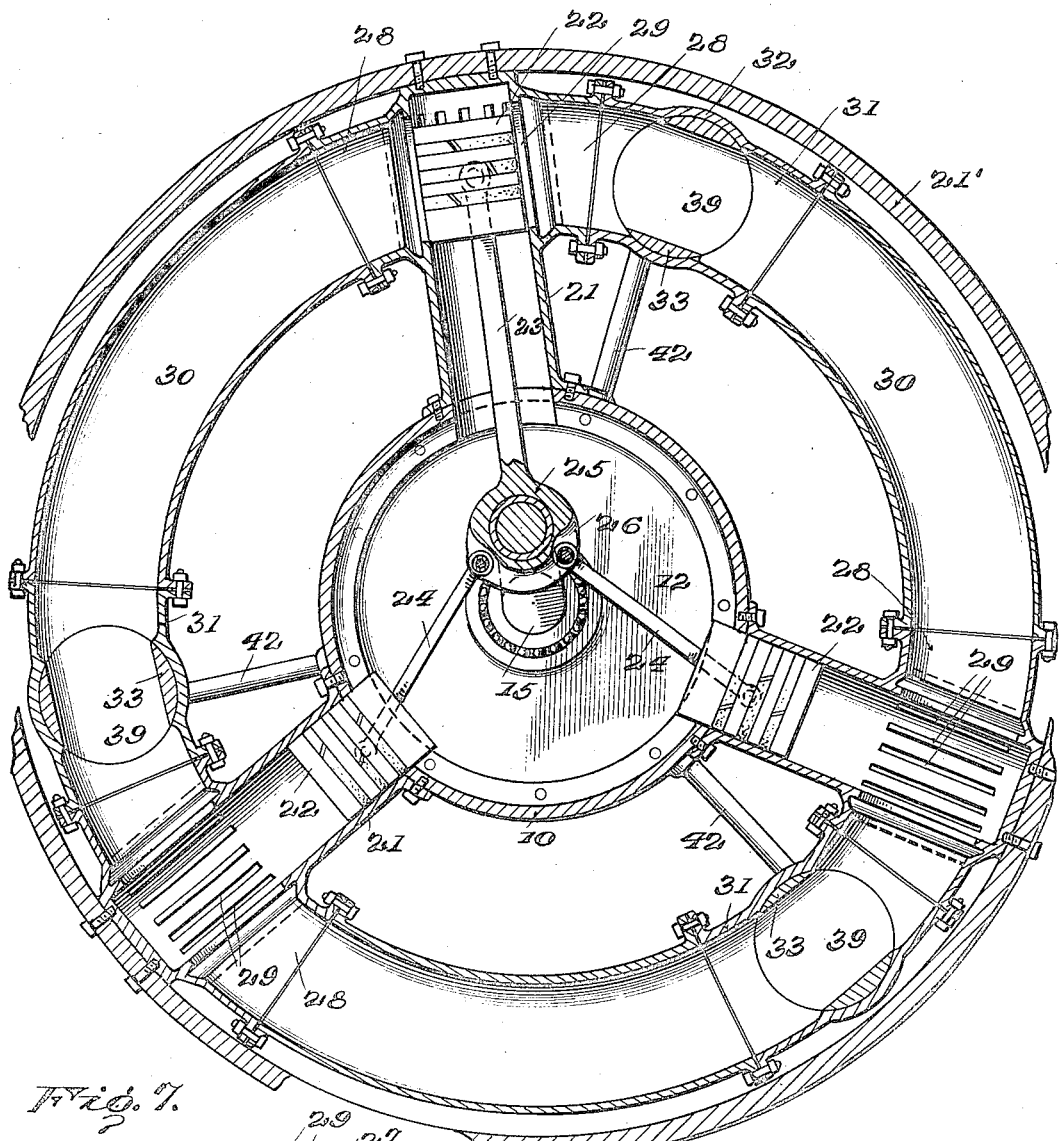
Figure 7:
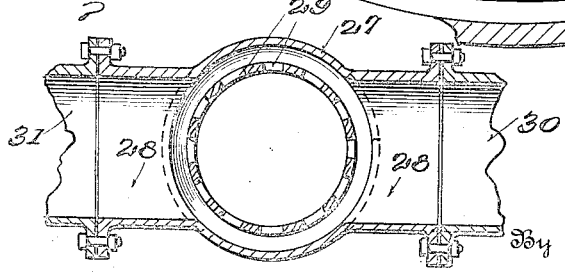

In the drawings:

Figure 1 is an elevation looking at the forward side of my improved transmission, Figure 2 is an elevation looking at the rear side of my improved transmission, Figure 3 is a vertical section on the line 3—3 of Figure 2, looking in the direction of the arrows, Figure 4 is a detail section showing one of the control valves of the device and associated parts, Figure 5 is a vertical section taken on the line 5—5 of Figure 3, looking in the direction of the arrows, Figure 6 is a section taken on the line 6—6 of Figure 3, looking in the direction of the arrows, and Figure 7 is a detail transverse section taken through the head of one of the cylinders of the device.

In carrying the invention into effect, I employ a crank case which is formed with a ring 10 to which are bolted or otherwise secured side plates 11 and 12 respectively. Mounted upon the plate 11 axially thereof is a drive head 3 which carries a stub drive shaft 14, this shaft being provided at its outer end with a suitable flange. Journaled upon the plates 11 and 12 of the casing is a driven crank shaft 15 extending in alinement with the drive shaft 14 and supported by suitable anti-friction bearings carried by said plates. The crank shaft is preferably formed of sections one of which carries the crank pin while the other of said sections is keyed or otherwise secured to said pin. Extending from the side plate 12 in concentric relation to the shaft 15 is a shell 16 closed at its outer end by an end plate 17 carrying a gland 18 which receives the shaft therethrough. Communication between this shell and the casing is cut off by a ring 19 which surrounds the shaft 15 overlying the anti-friction bearing upon the plate 12 of the casing and leading into the casing is a breather pipe 20 normally closed by a spring pressed cap, the pipe being designed to relieve any air pressure occurring in the casing.

Extending radially from the casing ring 10 is a plurality of cylinders 21 bolted or otherwise secured to said ring and surrounded by a guard ring 21'. Any approved number of cylinders may be employed but in the present instance I have shown the use of three of said cylinders. Slidable within these cylinders are pistons 22 each carrying a number of suitable piston rings and extending from one of said pistons is a connecting rod 23 while from the other pistons extend connecting rods 24. Formed on the inner end of the connecting rod 23 is a bearing 25 surrounding the crank pin of the shaft 15, a suitable bushing being preferably interposed between the bearing and the pin, and formed on said bearing are spaced flanges 26. The inner ends of the connecting rods 24 are received between these flanges and engaging through said flanges and through the bearings upon the inner ends of said rods are suitable pins connecting the rods to the bearing 25. As will thus be observed, a single bearing is employed for all of the connecting rods.

Surrounding the outer end portions of the cylinders 21 are jackets 27 from which extend oppositely directed nipples 28 lying in a plane with the crank case. The cylinders 21 are all of the same diameter and the nipples 28 are of a diameter corresponding to the diameter of said cylinders respectively. Formed in the wall of each of the cylinders within the respective jackets 27 is, as particularly brought out in Figure 7, an annular series of longitudinally directed ports 29, the series of ports extending entirely around the cylinders. As will be observed, the ports are spaced quite close together and said ports are of a length corresponding to the diameter of the cylinders. Thus, fluid may be permitted to flow freely through the ports 29 and through the nipples so as to offer a minimum of resistance to the movement of the pistons.

Connected to those of the nipples in advance of the cylinders 21 are fluid pipe sections 30 and connected to those of the nipples 28 beyond the cylinders are fluid pipe sections 31, the pipe sections 30 and 31 being secured together at their meeting ends. Communication is thus established between all of the cylinders and formed on the pipe sections 31 are, as particularly shown in Figure 5, valve chambers 32. Rotatably fitted in the valve chambers are valves 33. As particularly brought out in Figure 4, the valves are tapered longitudinally and are provided at their inner smaller ends with trunnions 34 engaging in suitable sockets in the inner end walls of the chambers. Threaded into the chambers at their outer ends are closure caps 35 which carry glands 36 receiving the stems 37 of the valves therethrough. At their ends the valves are provided with annular beveled faces 38, the innermost of which seat against similar faces formed at the inner ends of the valve chambers while the caps 35 are provided with beveled faces mating with the outermost of the beveled faces of the valves. A snug fluid-tight joint between the valves and the valve chambers is thus had. However, should wear occur, such wear may be readily taken up by properly adjusting the caps 35 and for this purpose the caps are preferably provided with suitable sockets for receiving a spanner wrench. Formed through the valves are transverse ports 39 of a diameter substantially equal to the diameter of the pipe sections 30 and 31 respectively and accordingly equal to the diameter of the cylinders 21. Fixed to the outer ends of the valve stems 37 are pinions 40 enclosed within suitable housings 41 having housing sleeves 42 depending therefrom. Slidable through these sleeves are rods 43, the upper end portions of which are provided with racks cooperating with the pinions. Surrounding the rods within the lower end portions of the sleeves are springs 44 bearing against suitable pins engaged through the rods and acting to normally project the rods radially outwardly and rotate the valves to open position. Consequently, under ordinary circumstances, flow of fluid from the cylinders 21 through the fluid pipes connecting said cylinders will be unhampered. In this connection it will, of course, be understood that a suitable fluid is to be introduced into the cylinders so that the pistons will act against said fluid and for this purpose one of the pipe sections 30 is provided with a suitable filler plug 20′. At their lower ends, the sleeves 42 enter the shell 16 and slidable upon the shaft 15 within said shell is a sleeve 45. Freely engaging between spaced flanges upon this sleeve is a collar 46 and pivotally connected to said collar are short rods 47 pivotally connected to the inner ends of the rods 43 by links 48. Adjacent its outer end portion the sleeve is provided with a second pair of spaced flanges and freely engaging between these flanges is a yoke 49 to which is connected an operating rod 50. Thus, by pulling outwardly upon the operating rod, the sleeve 45 will be moved to draw the rods 43 radially inward and cause rotation of the valves 33 toward closed position. Flow of fluid from one cylinder 21 to the other will thus be proportionately cut off and, of course, by continuing the outward movement of the sleeve 45, the valves may be completely closed. As the flow of fluid from one cylinder to the other is thus restricted, a corresponding resistance will be offered by the fluid to the movement of the pistons within the cylinders until, when the valves are completely closed, the fluid will be trapped to accordingly lock the pistons against movement. When this occurs, the shaft 15 will then turn with the crank case. In the practical use of the device, an engine or other power shaft is, of course, connected to the flange of the shaft 14 while the shaft 15 is connected to the element to which it is desired to transmit power. Accordingly, in employing the device in connection with motor vehicles, the engine crank shaft will be connected to the shaft 14 while the shaft 15 will be connected to the propeller shaft of the vehicle. When so employed, any approved means may be used for conveniently operating the rod 50. It will accordingly be seen that I provide a highly effective transmission and a mechanism whereby a power shaft may be coupled to a driven shaft without jar or jerk for turning the latter shaft at practically any speed up to the speed of the power shaft when the shafts will turn in unison.

Having thus described the invention, what is claimed as new is:

1. A fluid transmission including a casing, a shaft journaled thereon, cylinders radiating from the casing, jackets surrounding said cylinders, the cylinders being provided with ports opening into said jackets, pistons mounted to reciprocate within the cylinders and connected to said shaft, fluid pipes connecting said jackets, and means for controlling flow of a fluid through said pipes.

2. A fluid transmission including a casing, a shaft journaled thereon, cylinders radiating from the casing and each provided at its outer end portion with an annular series of longitudinally directed ports, jackets surrounding the ports of the cylinders, pistons mounted to reciprocate within the cylinders and connected to said shaft, fluid pipes connecting said jackets, and means for controlling flow of a fluid through said pipes.

3. A fluid transmission including a casing having a shell extending therefrom, a shaft journaled on the casing and extending through said shell, cylinders radiating from the casing, fluid pipes connecting said cylinders, pistons mounted to reciprocate within the cylinders and connected to said shaft, rotatable valves interposed in said pipes for controlling flow of fluid therethrough, actuating means for the valves extending into said shell, and means carried by said shaft for operating said first mentioned means simultaneously.

4. A fluid transmission including a casing, a shaft journaled thereon, cylinders radiating from the casing and each provided throughout the circumference thereof with a series of spaced ports, jackets enclosing the ports of the cylinders, pistons mounted to reciprocate within the cylinders connected with said shaft, fluid pipes connecting said jackets, and means for controlling flow of fluid through said pipes.

5. A fluid transmission including a casing, a shaft journaled thereon, cylinders radiating from the casing, pistons mounted to reciprocate in said cylinders connected with the shaft, fluid pipes connecting said cylinders, rotatable valves interposed in said pipes for controlling flow of a fluid through the pipes, the valves being provided with stems, pinions on said stems, rods having racks to coact with said pinions for rotating the valves, a shell on the casing having said rods extending therethrough, casings housing said rods and pinions connected to the shell, and means for shifting the rods simultaneously to actuate the valves.

In testimony whereof I affix my signature.

ELMER D. HILBISH. [L. S.]